P. M. BEERS.
Machine for Trimming Needle-Blanks.

No. 166,245. Patented Aug. 3, 1875.

WITNESSES.
a. H. Norris.
James L. Norris.

Philo M. Beers
by Boyd Eliot
atty for him
INVENTOR.

UNITED STATES PATENT OFFICE.

PHILO M. BEERS, OF BRIDGEPORT, CONNECTICUT.

IMPROVEMENT IN MACHINES FOR TRIMMING NEEDLE-BLANKS.

Specification forming part of Letters Patent No. 166,245, dated August 3, 1875; application filed July 26, 1875.

*To all whom it may concern:*

Be it known that I, PHILO M. BEERS, of Bridgeport, in the county of Fairfield and State of Connecticut, have invented certain Improvements in Machines for Trimming Needle-Blanks, &c., of which the following is a specification:

This invention has for its object the trimming and cutting off blanks for needles to their proper length after being drawn and swaged to their proper size; and it consists in combining with the trimming shears or cutters a suitable feeding or guiding mechanism for carrying and controlling or conducting the blanks to the said cutters, as will hereinafter appear.

Figure 1:
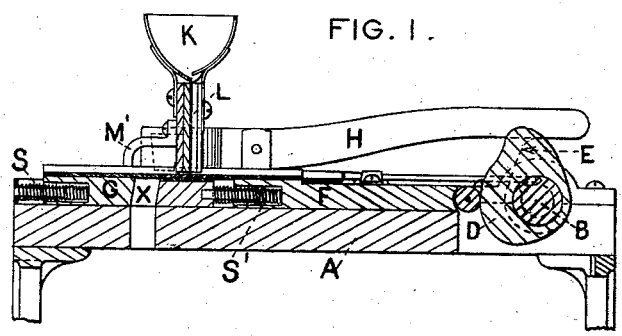
Figure 2:
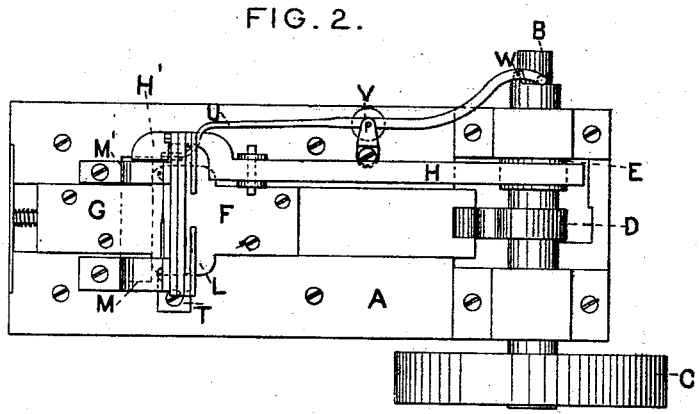
Figure 3:
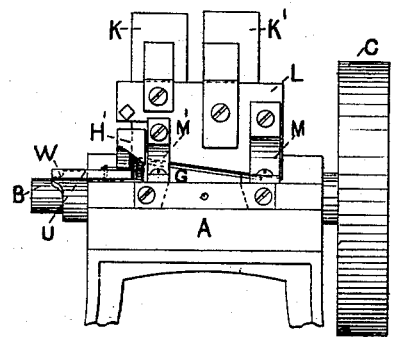
Figure 4:
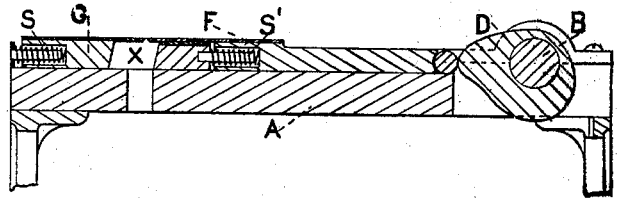

In the drawings, Figure 1 is a longitudinal section of the machine. Fig. 2 is a plan or top view of the same. Fig. 3 is an end elevation, as seen from the front; and Fig. 4 is a partial section, to show the position of the guides at the close of the operation, or where the blanks fall from the machine after being trimmed.

At A is shown the frame or bed of the machine, which may be mounted upon feet, or be simply a bench, upon one end of which is mounted a driving-shaft, as at B, upon one end of which is placed a driving-pulley, as at C, and upon said shaft are mounted the cams D and E, the first of which gives motion to the feeding-slides F and G, and the second, as at E, to the shear-lever, as at H, which does the trimming as any ordinary pair of machine-shears. The blanks as they come from the swaging-machine, which reduces them to the proper size for the needles desired to be made, are placed in a hopper, as at K, of a proper shape to hold them, and whence they are conveyed down through a chute or guide, as at L, which is supported on the brackets M M′, which hold the said chute and hopper suspended above the guides F and G, which receive the blanks between their abutting ends, and convey them to their proper place to be trimmed or to the cutters. One end of said hopper, as at K′, is made of a certain size and fixed, while the other end is made adjustable to correspond to the various sizes of needles, and the chute is also made adjustable to adapt it to the various sizes of the blanks as they come from the swaging-machine. The lower end of the chute is also inclined across the machine, as shown at Fig. 3, to adapt it to the taper of the blanks, or at least to partially accommodate it to the difference between the shank and the point of the blank. Under the said chute are placed the guides F and G, which are simply two sliding bars working in rabbets or grooves, and whose ends abut together, and are so shaped at said ends as to receive the blank between them as it drops from the chute or guide from the hopper. Said guides are held in contact with each other by springs, as at S and S′, and the cam D on the main shaft, which reacts against the springs, and shoves the guides F and G to their proper position to bring the blanks to the trimming shears or cutters at H′, and also to drop it from the machine. At T is fixed a stop made adjustable by said screw, and against said stop the end of the blank that is finished is pressed by a spring-lever acting against the opposite end, as at U, and which is best seen at Fig. 2, where said lever is shown as pivoted near its center to the frame A, as at V, and is operated by a cam on the main shaft, as at W, which causes the lever to act upon the end of the blank just before the shear-lever catches it. As the blanks are liable to vary in their length as they come from the swaging-machine, one portion of the lever U is made sufficiently elastic to yield to suit said variations in length.

The method of adjusting the chute to the different sizes is to insert a plate of the proper thickness to form a groove suitable to the size of the needle. This, of course, is only done at the end where the trimming is done, or at the side next to the cutters, as the other end for sewing-machine needles is always of the same size, at least for the same class of sewing-machines, and therefore neither the chute nor the hopper need be varied for the shank of the needle-blanks. When each blank is trimmed, the guides are forced forward past the ends of the cutting-shears and carry the blank over the open space in the frame or table A, as shown at X, where it drops down, when the guides are returned for another one, being carried back by the springs S and S' against the cam D, as already described.

It is evident that such a machine may be used for trimming other articles than needles for sewing-machines, provided they are of similar shape.

I therefore claim—

1. In a machine for trimming needle-blanks, &c., the combination of the cutting-shears, the hopper, and chute with the guides F and G, as and for the purposes set forth.

2. In combination with the shears or cutters the stop T, and the pressure-lever U, as and for the purposes set forth.

3. The adjustable hopper and chute in combination, constructed and arranged substantially as described, and for the purposes set forth.

PHILO M. BEERS.

Attest:
 JAMES L. NORRIS,
 BOYD ELIOT.